(12) United States Patent
Kitayama et al.

(10) Patent No.: US 10,987,930 B2
(45) Date of Patent: Apr. 27, 2021

(54) MANUFACTURING METHOD OF LIQUID SUPPLY COMPONENT

(71) Applicant: CANON KABUSHIKI KAISHA, Tokyo (JP)

(72) Inventors: Yasuaki Kitayama, Yokohama (JP); Yukuo Yamaguchi, Tokyo (JP); Kyosuke Toda, Kawasaki (JP); Keiichiro Tsukuda, Yokohama (JP); Kazuhiko Okito, Hiratsuka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/265,163

(22) Filed: Feb. 1, 2019

(65) Prior Publication Data
US 2019/0255853 A1     Aug. 22, 2019

(30) Foreign Application Priority Data

Feb. 16, 2018 (JP) .............................. JP2018-025835

(51) Int. Cl.
*B41J 2/16*      (2006.01)
*B29C 45/14*   (2006.01)
(Continued)

(52) U.S. Cl.
CPC ....... *B41J 2/1637* (2013.01); *B29C 45/14467* (2013.01); *B29C 45/16* (2013.01);
(Continued)

(58) Field of Classification Search
CPC ........ B41J 2/1623; B41J 2/1637; B41J 2/175; B41J 2/1752; B41J 2/17523;
(Continued)

(56) References Cited

U.S. PATENT DOCUMENTS 5,758,417 A     6/1998  Kobayashi et al.
9,764,554 B2    9/2017  Amma et al.
(Continued)

FOREIGN PATENT DOCUMENTS

CN     106182556 A     12/2016
CN     106182607 A     12/2016
(Continued)

OTHER PUBLICATIONS

Omura et al., U.S. Appl. No. 16/265,104, filed Feb. 1, 2019.
First Office Action in Chinese Application No. 201910115233.9 (dated Aug. 2020).

*Primary Examiner* — A. Dexter Tugbang
(74) *Attorney, Agent, or Firm* — Venable LLP

(57) ABSTRACT

A manufacturing method of a liquid supply component in which a liquid supply path is formed between a first constituent component and a second constituent component that are joined with molten resin. The method includes a first step of preparing these constituent components, a second step of causing the constituent components to face each other and forming an orifice portion and a reservoir portion between a mold and a surface of either of the constituent components, and a third step of pouring the molten resin between the constituent components so that it flows into the reservoir portion through the orifice portion.

7 Claims, 16 Drawing Sheets

(51) Int. Cl.
*B41J 2/175* (2006.01)
*B29C 45/16* (2006.01)
*B29L 31/00* (2006.01)
*B29C 45/46* (2006.01)

(52) U.S. Cl.
CPC ............ *B41J 2/1623* (2013.01); *B41J 2/175* (2013.01); *B41J 2/1752* (2013.01); *B41J 2/17523* (2013.01); *B41J 2/17553* (2013.01); *B41J 2/17559* (2013.01); *B29C 45/462* (2013.01); *B29L 2031/767* (2013.01); *B29L 2031/7678* (2013.01)

(58) Field of Classification Search
CPC ............ B41J 2/17553; B41J 2/17559; B29C 45/14467; B29C 45/16; B29C 45/462; B29L 2031/767; B29L 2031/7678
See application file for complete search history.

(56) References Cited

U.S. PATENT DOCUMENTS

| | | | |
|---|---|---|---|
| 9,931,850 B2 | 4/2018 | Iwano et al. | |
| 10,071,512 B2 | 9/2018 | Kimura et al. | |
| 10,307,967 B2 | 6/2019 | Toda et al. | |
| 10,363,692 B2 | 7/2019 | Oikawa et al. | |
| 10,434,694 B2 | 10/2019 | Iijima et al. | |
| 10,513,069 B2 | 12/2019 | Oikawa et al. | |
| 2009/0218734 A1* | 9/2009 | Eberth | B29C 45/462 264/571 |
| 2015/0174800 A1* | 6/2015 | Imamura | B41J 2/1637 156/245 |
| 2016/0346967 A1 | 12/2016 | Oikawa et al. | |
| 2016/0346969 A1 | 12/2016 | Toda et al. | |
| 2016/0346970 A1 | 12/2016 | Oikawa et al. | |
| 2016/0347066 A1 | 12/2016 | Amma et al. | |
| 2016/0347072 A1 | 12/2016 | Iwano et al. | |
| 2018/0001527 A1 | 1/2018 | Iijima et al. | |
| 2018/0029266 A1 | 2/2018 | Tsujiuchi et al. | |
| 2018/0029267 A1 | 2/2018 | Tsujiuchi et al. | |
| 2018/0141341 A1 | 5/2018 | Amma et al. | |

FOREIGN PATENT DOCUMENTS

| | | | |
|---|---|---|---|
| CN | 106183426 A | | 12/2016 |
| CN | 106183426 B | | 6/2018 |
| JP | 2001018259 A | * | 1/2001 |
| JP | 2001-347536 A | | 12/2001 |

* cited by examiner

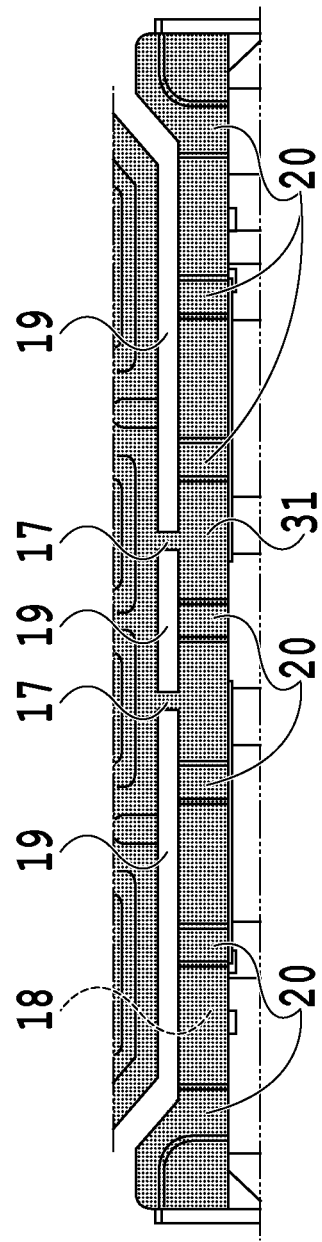
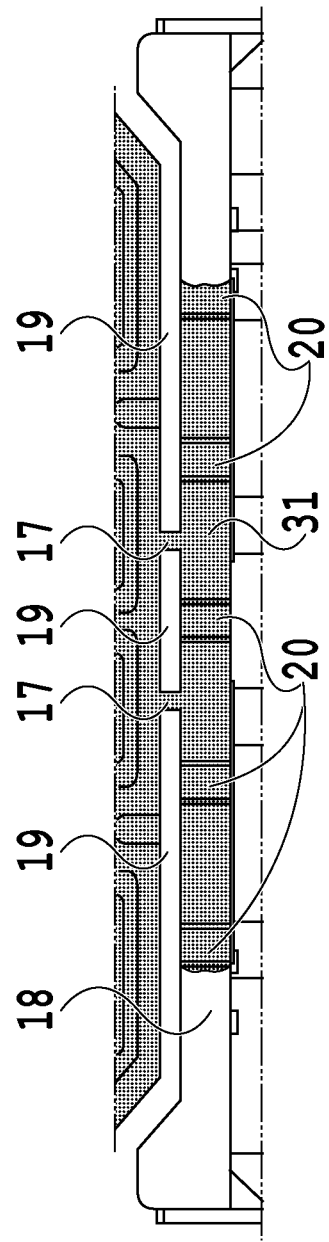
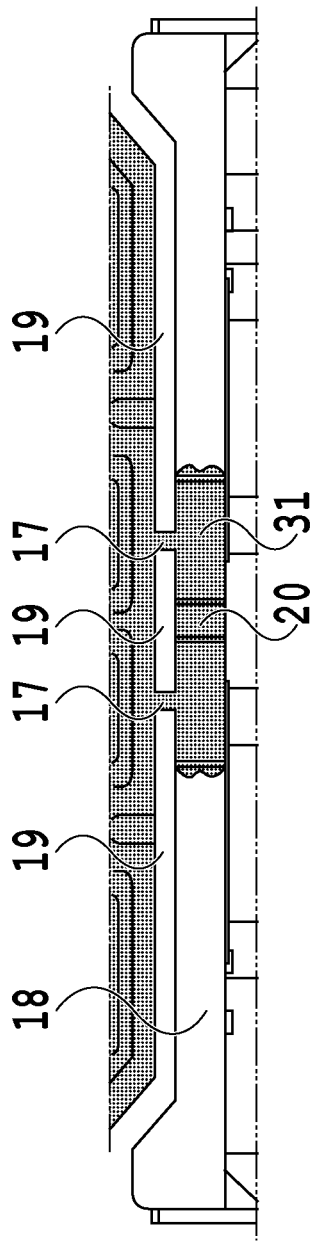
FIG.13A
FIG.13B
FIG.13C

MANUFACTURING METHOD OF LIQUID SUPPLY COMPONENT

BACKGROUND OF THE INVENTION

Field of the Invention

The present invention relates to a manufacturing method and manufacturing apparatus of a liquid supply component in which a liquid supply path is formed, and a liquid ejection head.

Description of the Related Art

Japanese Patent Laid-Open No. 2001-347536 discloses a liquid supply component in which a liquid supply path is formed between a first constituent component and a second constituent component that are joined with molten resin. A method of manufacturing this liquid supply component uses a reservoir portion located outside the first constituent component and the second constituent component. More specifically, molten resin flowing from between the first constituent component and the second constituent component flows into the reservoir portion located outside the first constituent component and the second constituent component through an orifice portion. This enables absorption of variations in the filling volume of molten resin.

SUMMARY OF THE INVENTION

In Japanese Patent Laid-Open No. 2001-347536, the reservoir portion is located outside the first constituent component and the second constituent component. Accordingly, an excess portion formed from molten resin in the reservoir portion comes to be jointed externally to the liquid supply component with a narrow portion formed from molten resin in the orifice portion. The excess portion located outside the liquid supply component requires postprocessing such as removal because the excess portion causes interference with external components and a decrease in weight balance and has a possibility of dropping off.

The present invention provides a manufacturing method and manufacturing apparatus of a liquid supply component, and a liquid ejection head that are capable of improving the productivity and reliability of a liquid supply component.

In the first aspect of the present invention, there is provided a manufacturing method of a liquid supply component in which a liquid supply path is formed between a first constituent component and a second constituent component that are joined with molten resin, the method comprising:

a first step of preparing the first constituent component and the second constituent component;

a second step of causing the first constituent component and the second constituent component to face each other and forming an orifice portion and a reservoir portion between a mold and a surface of either of the first constituent component and the second constituent component; and a third step of pouring the molten resin between the first constituent component and the second constituent component so that the molten resin flowing from between the first constituent component and the second constituent component flows into the reservoir portion through the orifice portion.

In the second aspect of the present invention, there is provided a manufacturing apparatus of a liquid supply component in which a liquid supply path is formed between a first constituent component and a second constituent component that are joined with molten resin, the apparatus comprising:

a first mold and a second mold;

a molding unit configured to injection-mold the first constituent component between a first position of the first mold and a first position of the second mold and injection-mold the second constituent component between a second position of the first mold and a second position of the second mold;

a moving unit configured to open the first mold and the second mold so that the first constituent component is left at the first position of the first mold and the second constituent component is left at the second position of the second mold and then relatively move the first mold and the second mold so that the first constituent component and the second constituent component face each other;

a unit configured to close the first mold and the second mold so that the first constituent component and the second constituent component face each other and form an orifice portion and a reservoir portion between either of the first mold and the second mold and a surface of corresponding one of the first constituent component and the second constituent component; and a unit configured to pour the molten resin between the first constituent component and the second constituent component so that the molten resin flowing from between the first constituent component and the second constituent component flows into the reservoir portion through the orifice portion.

In the third aspect of the present invention, there is provided a liquid ejection head comprising a liquid supply component and an ejection unit configured to eject liquid supplied from a liquid supply path of the liquid supply component, wherein the liquid supply component comprises a first constituent component, a second constituent component, and molten resin for joining the first constituent component and the second constituent component, the first constituent component and the second constituent component form a liquid supply path therebetween, and a narrow portion and an excess portion continuous to the narrow portion are formed from the molten resin on a surface of either of the first constituent component and the second constituent component.

According to the present invention, the reservoir portion for absorbing variations in the filling volume of the molten resin is formed on the surface of either of the first constituent component and the second constituent component, thereby removing the necessity for postprocessing of the excess portion formed from the molten resin in the reservoir portion. As a result, the productivity and reliability of the liquid supply component can be improved.

Further features of the present invention will become apparent from the following description of exemplary embodiments with reference to the attached drawings.

BRIEF DESCRIPTION OF THE DRAWINGS

FIG. 13A, FIG. 13B, and FIG. 13C are illustrations of the cases of different filling volumes of molten resin in the ink supply component of FIG. 1A;

DESCRIPTION OF THE EMBODIMENTS

The embodiments of the present invention are described below with reference to the drawings.

First Embodiment

Figure 1A:
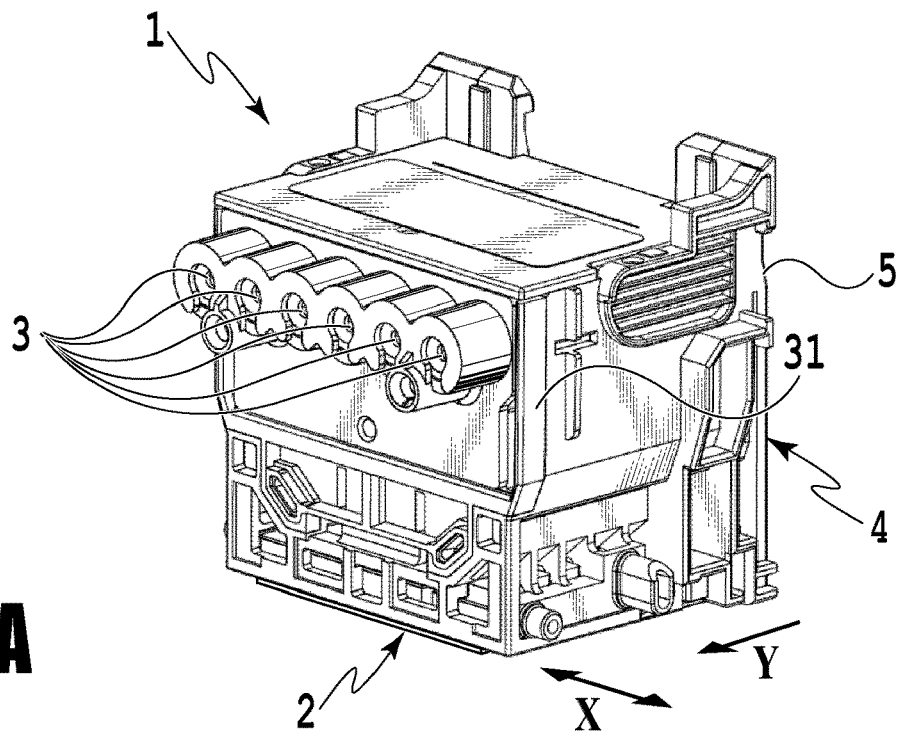
FIG. 1A is a perspective view of a print head comprising an ink supply component according to a first embodiment of the present invention and FIG. 1B is an exploded perspective view of the print head.

FIG. 1A is a perspective view of an inkjet print head (liquid ejection head) 1 according to the present embodiment.

The print head 1 of the present embodiment is detachably mounted on a carriage of a so-called serial scan type inkjet printing apparatus (not shown) and fixed to the carriage by a positioning unit and electric contact of the carriage. The printing apparatus is equipped with an ink tank (not shown) storing ink (liquid) and an ink supply tube (not shown) connecting the ink tank to an ink introducing port 3 of the print head 1. Ink is supplied from the ink tank to an ink supply component (liquid supply component) 4. The print head 1 is equipped with a printing element portion (ejection portion) 2 configured to eject ink in a downward direction in FIG. 1A. In the ink supply component 4, an ink supply path (liquid supply path) is formed to connect the ink introducing port 3 to the printing element 2. In the present embodiment, six ink supply paths corresponding to six ink introducing ports 3 are formed.

The print head 1 is moved together with the carriage in a main scan direction (first direction) of arrow X. A print medium (not shown) is conveyed in a sub scan direction (second direction) of arrow Y crossing (in the present embodiment, orthogonal to) the main scan direction. In the printing element portion 2, a plurality of ejection ports are arrayed in a predetermined direction crossing (in the present embodiment, orthogonal to) the sub scan direction. Each ejection port is equipped with an ejection energy generation element for ejecting ink from the ejection port. An image is printed on a print medium by repeating a print scan in which the print head 1 ejects ink while moving together with the carriage in the main scan direction and a conveyance operation in which the print medium is conveyed in the sub scan direction.

Figure 1B:
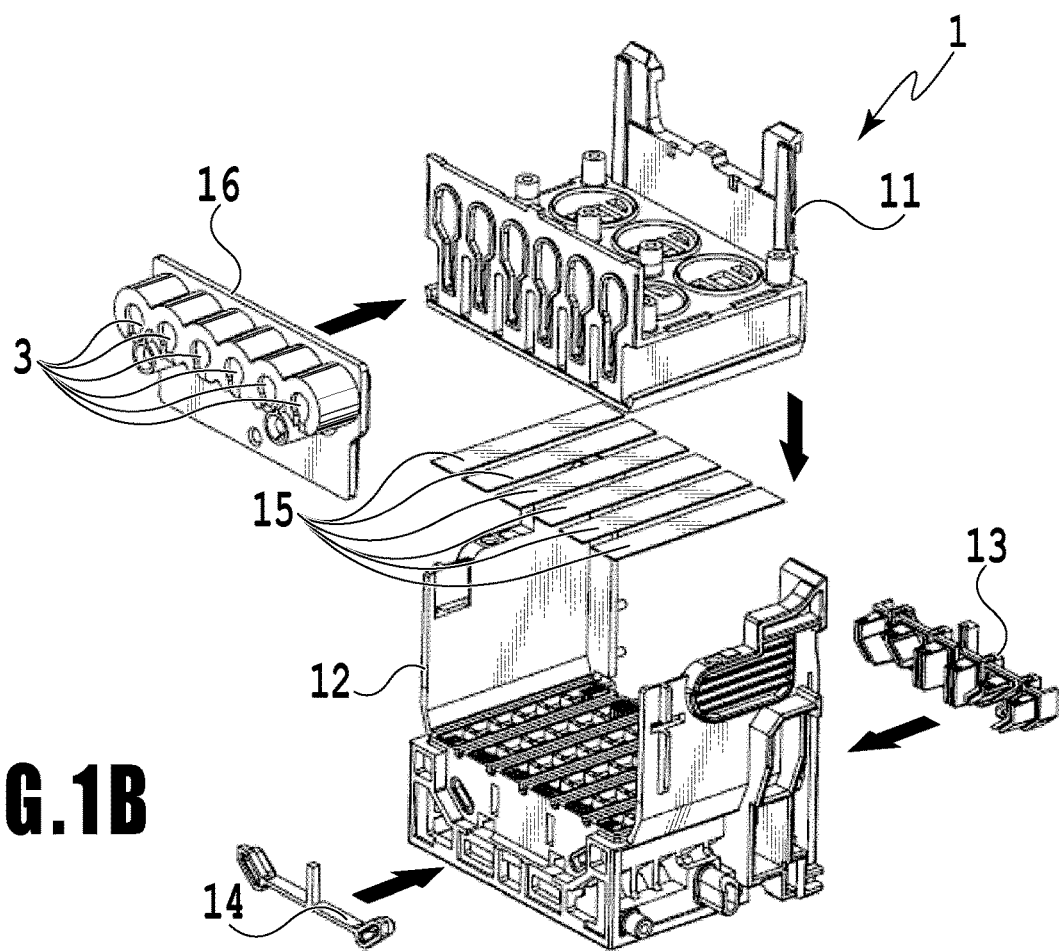
Figure 2:
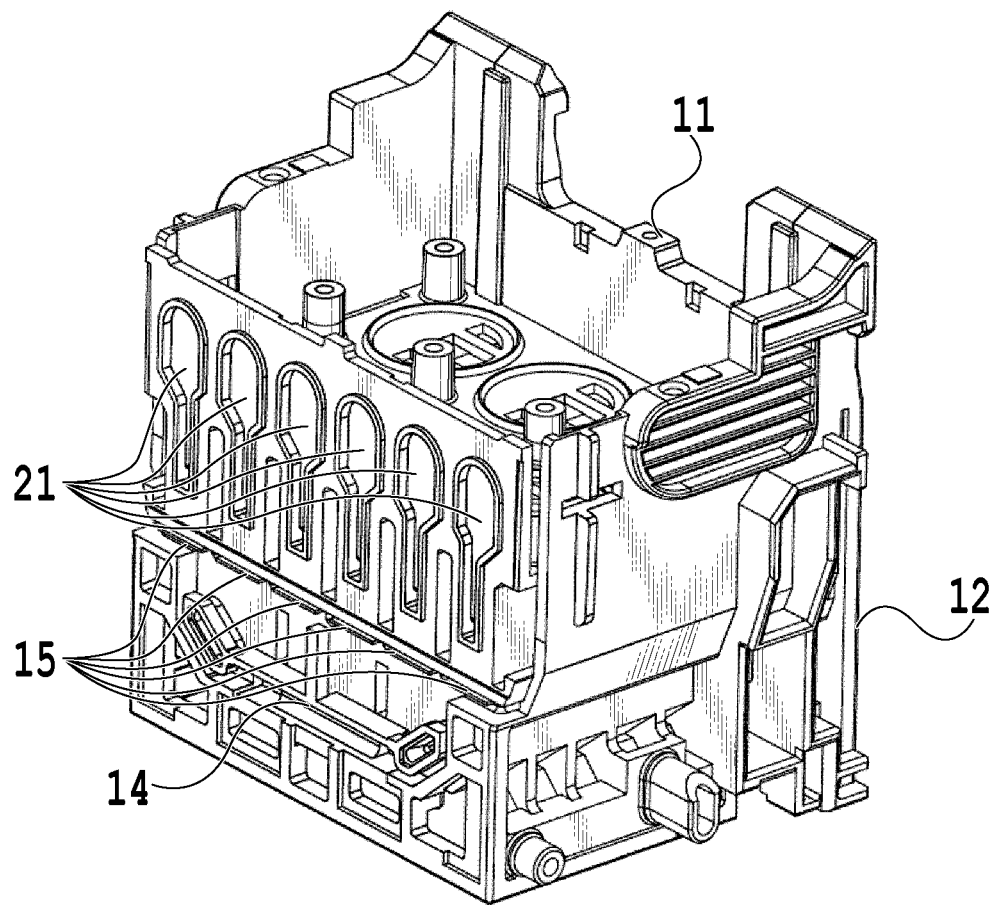
FIG. 2 is a perspective view of the ink supply component of FIG. 1A at a middle stage of manufacture.
Figure 3A:
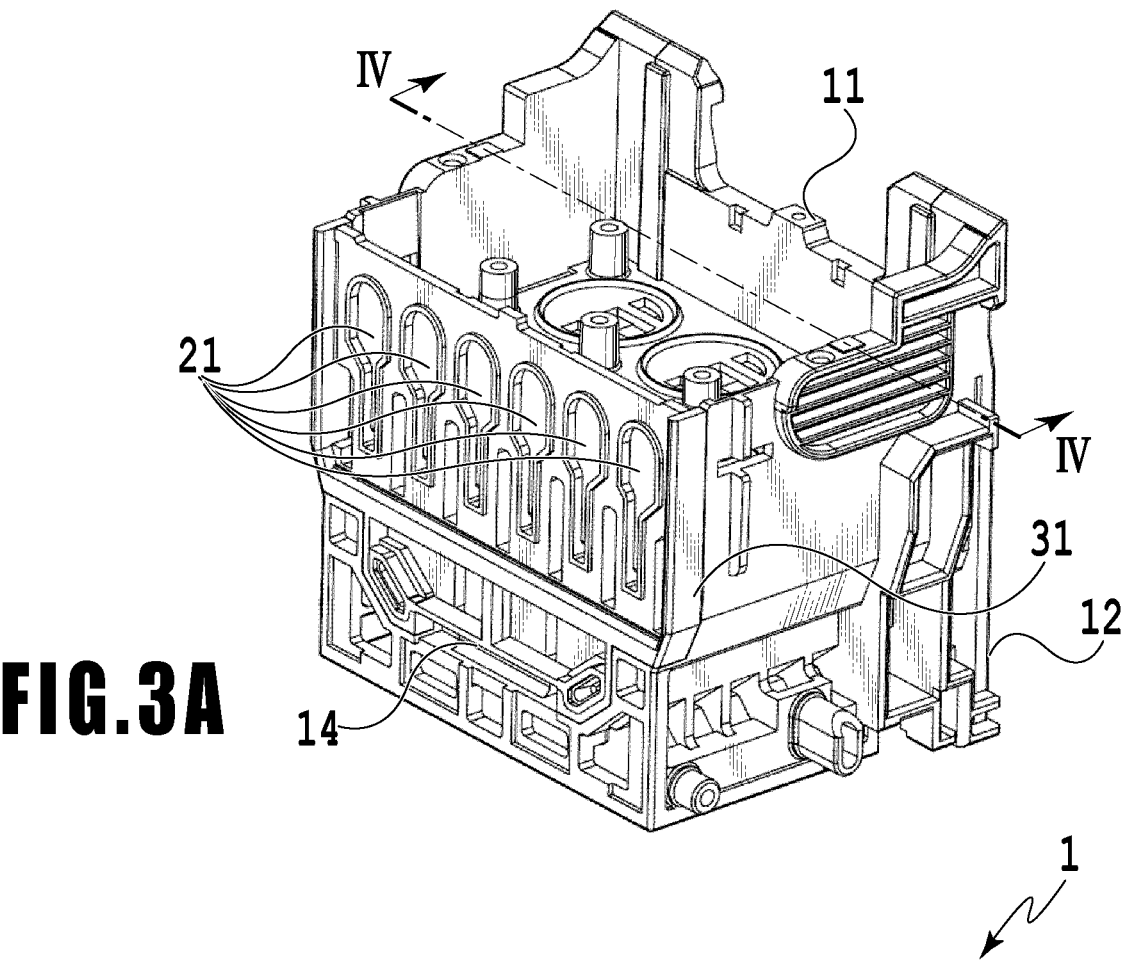
FIG. 3A and FIG. 3B are perspective views of the ink supply component of FIG. 1A from different directions.
Figure 3B:
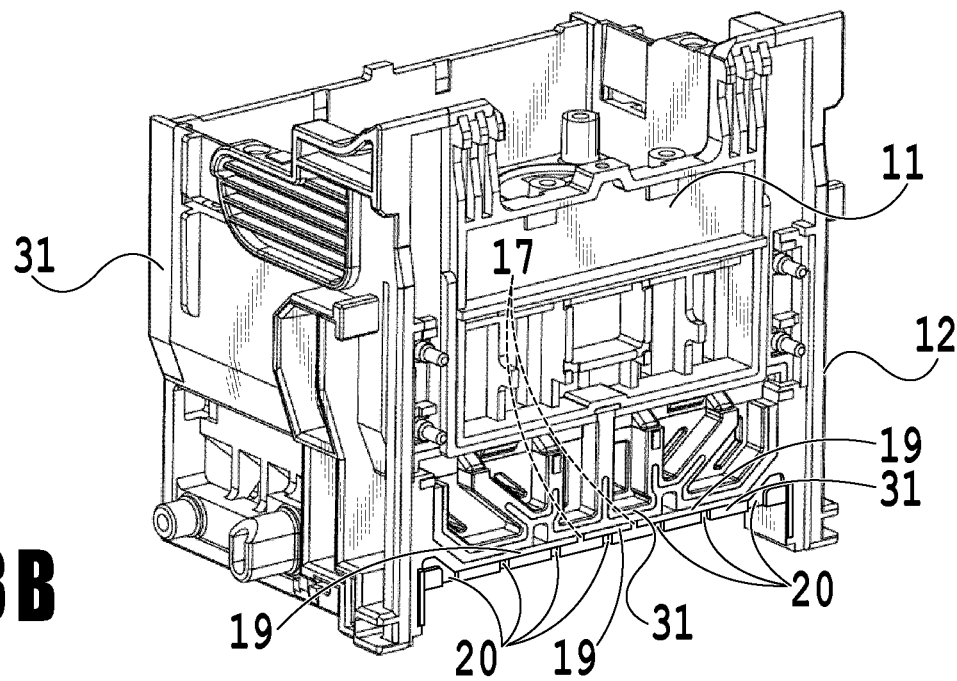

FIG. 1B is an exploded perspective view of the ink supply component 4. The ink supply component 4 includes a first flow path forming member (first constituent component) 11, a second flow path forming member (second constituent component) 12, a first lid member 13, a second lid member 14, a filter 15, and an ink introducing member (liquid introducing member) 16. As will be described later, the first flow path forming member (hereinafter also referred to as "first forming member") 11, the second flow path forming member (hereinafter also referred to as "second forming member") 12, the first lid member 13, and the second lid member 14 are obtained by primary molding using a mold. After that, in the same mold, these primary molded articles 11, 12, 13, and 14 and the filter 15 are assembled (see FIG. 2) and then fixed by secondary molding resin (molten resin) 31 as shown in FIG. 3A and FIG. 3B. This makes it possible to reduce the number of parts of the ink supply component 4 and the number of manufacturing man-hours.

As a comparative example, a case where the constituent members of the ink supply component 4 are individually joined is considered. For example, the filter 15 is fixed to the first forming member 11 by heat welding, the first and second forming members 11 and 12 are joined with an adhesive, and the first and second lid members 13 and 14 are joined to the second forming member 12 with an adhesive. Then, the ink introducing port member 16 is joined to the first forming member 11 by vibration welding. In this method, it is difficult to improve manufacturing efficiency of the print head 1.

Figure 4:
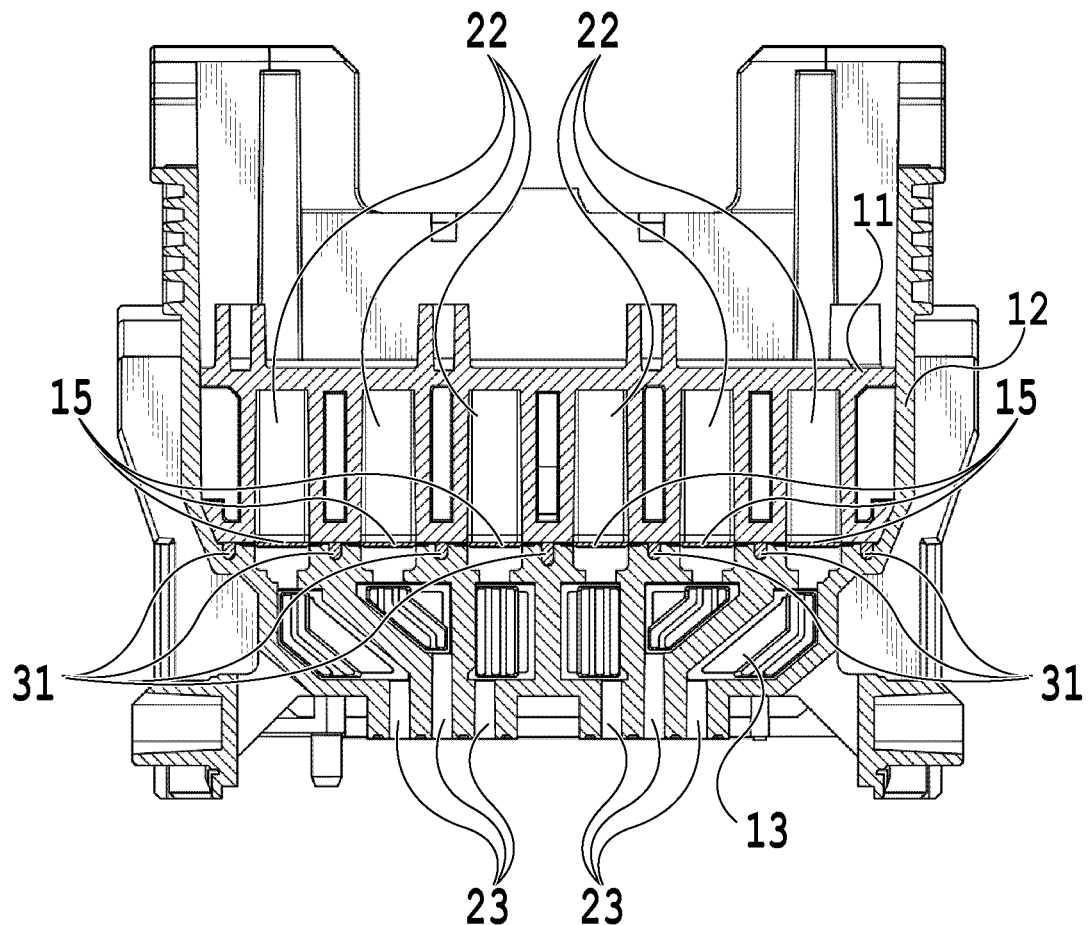
FIG. 4 is a cross-sectional view along line IV-IV of FIG. 3A.

FIG. 3A and FIG. 3B are perspective views, from different directions, of the ink supply component 4 integrated by secondary injection molding of the secondary molding resin 31. FIG. 4 is a cross-sectional view along line IV-IV of FIG. 3A.

In the first forming member 11 connected with the ink introducing port member 16, sub tanks (liquid storage space) 22 communicating with the ink introducing port portions 3 of the ink introducing port member 16 is formed as shown in FIG. 4. In the present embodiment, six sub tank portions 22 corresponding to the six ink introducing ports 3 are formed. In the sub tank portion 22, a sub tank introducing port 21 connected to the ink introducing port 3 is formed as shown in FIG. 3A. In the second forming member 12, an ink supply port 23 communicating with the printing element portion 2 is formed as shown in FIG. 4. The second forming member 12, the first lid member 13, and the second lid member 14 form an ink supply path (liquid supply path)

passing between the sub tank 22 and the ink supply port 23. Ink is supplied from the sub tank portion 22 to the printing element portion 2 through the ink supply path. In the present embodiment, six ink supply paths are formed between the six sub tank portions 22 and six ink supply ports 23. The ink supply component 4 includes a plurality of sub tank portions 22, a plurality of ink supply ports 23 at narrower pitch than that between the sub tank portions 22, and a plurality of bent liquid supply paths passing between the sub tank portions 22 and the ink supply ports 23. The sub tank portions 22 serve as large liquid chambers trapping foreign matter such as bubbles and dusts in ink.

As shown in FIG. 4, first opening portions communicating with the sub tank portions 22 are formed on the lower surface of the first forming member 11 and second opening portions communicating with the ink supply ports 23 through the bent flow paths are formed on the upper surface of the second forming member 12. The filter 15 is interposed between these opening portions. Ink supply paths are formed through the first opening openings, the filter 15, and the second opening portions.

Six printing element portions 2 are provided to correspond to the six ink supply ports 23. In each printing element portion 2, a plurality of electrothermal transducers (heaters), piezoelectric elements or the like are arrayed as ejection energy generation elements for ejecting ink so that ink supplied through the liquid supply paths can be ejected from the ejection ports. These ejection energy generation elements are controlled by an unshown ejection control unit in the printing apparatus. In the case of using electrothermal transducers, heat generated by them allows ink to bubble and the bubbling energy can be used to eject ink from the ejection ports.

Next, a manufacturing method of the ink supply component 4 is described.

Figure 5:
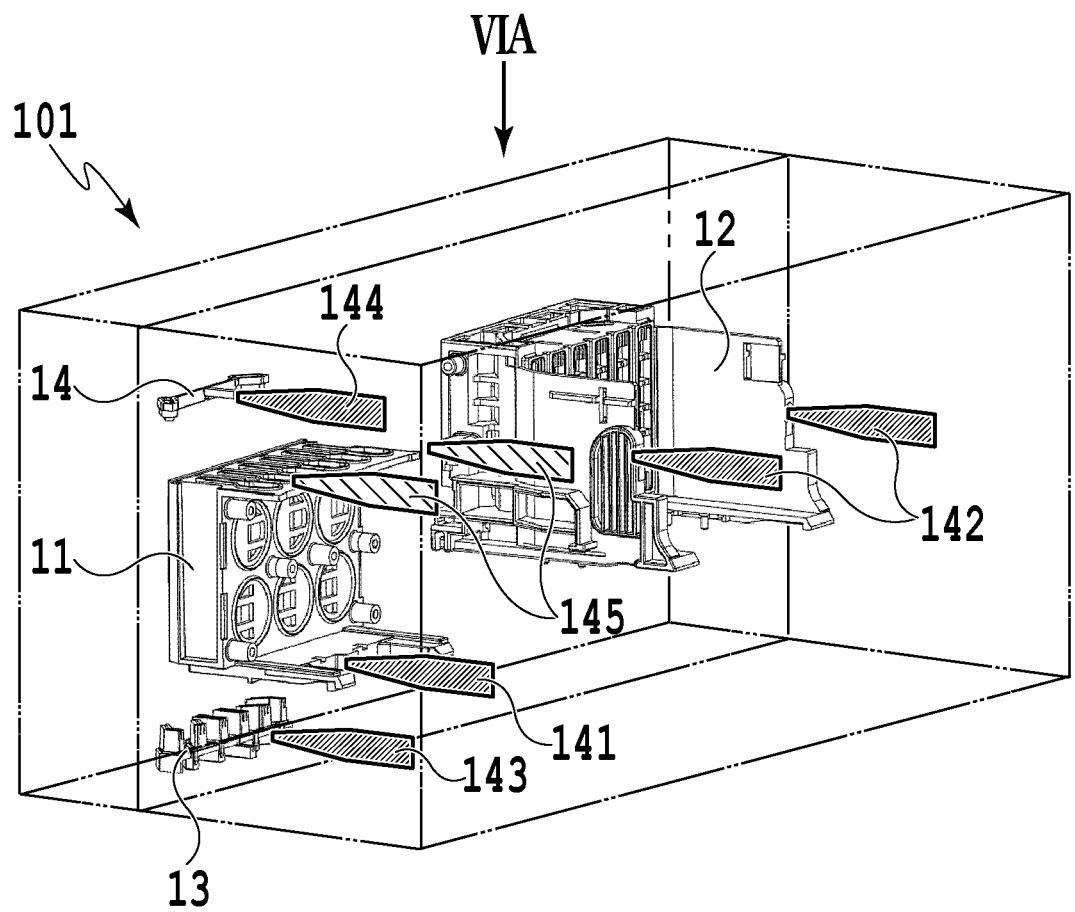
FIG. 5 is a perspective view of a mold at a manufacturing stage of the ink supply component of FIG. 1A.

FIG. 5 is a schematic perspective view of a mold 101 for manufacturing the ink supply component 4. The mold 101 comprises a primary molding gate 141 for molding the first forming member 11 and primary molding gates 142 for molding the second forming member 12. The mold 101 also comprises a primary molding gate 143 for molding the first lid member 13 and a primary molding gate 144 for molding the second lid member 14. The mold 101 further comprises secondary molding gates 145 for joining with the secondary molding resin 31.

Figure 6A:
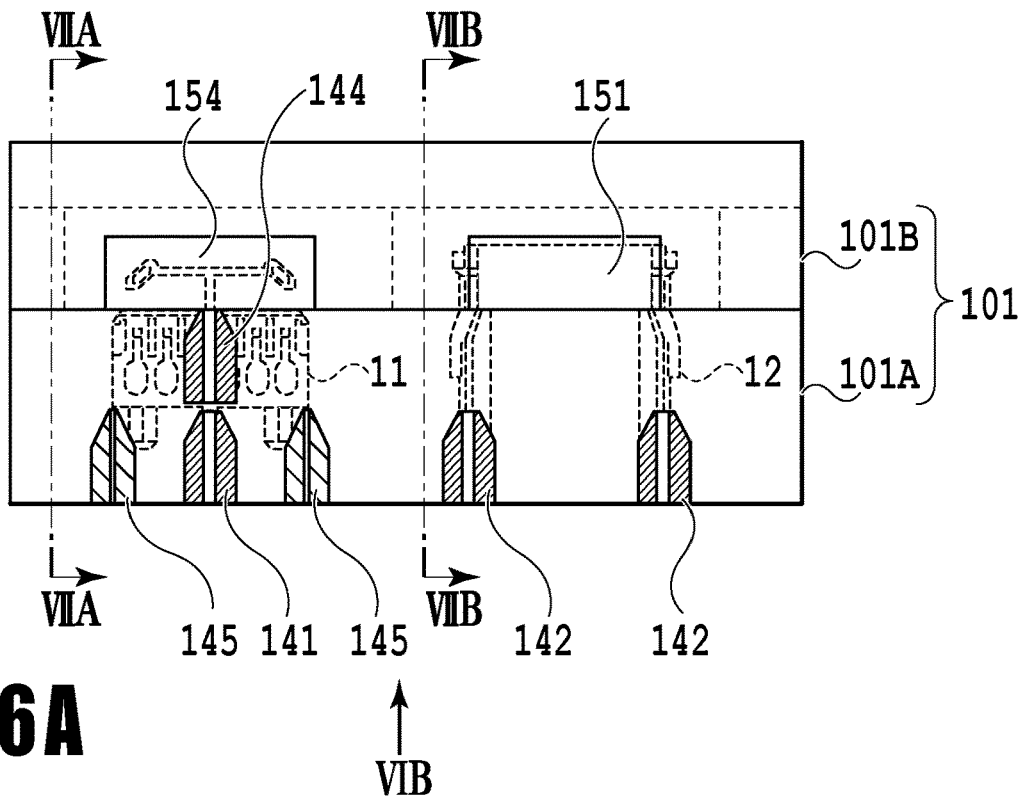
FIG. 6A is a VIA arrow view of FIG. 5
Figure 6B:
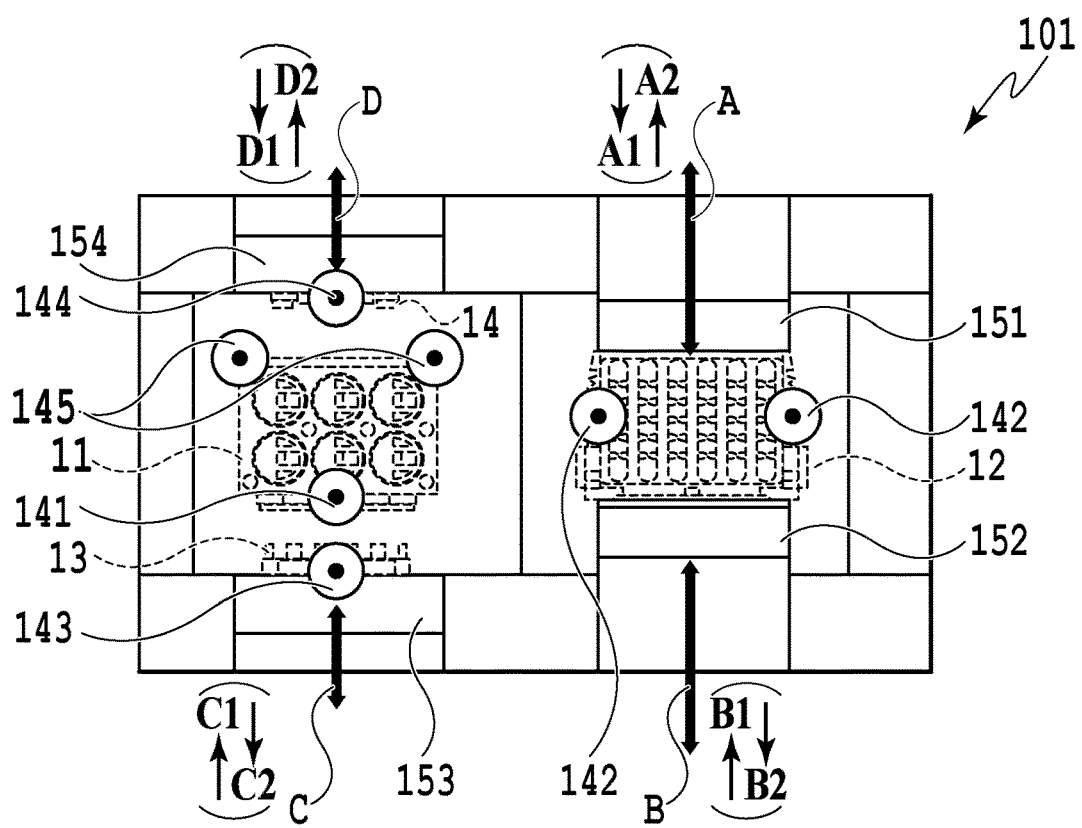
FIG. 6B is a VIB arrow view of FIG. 6A.
Figure 7A:
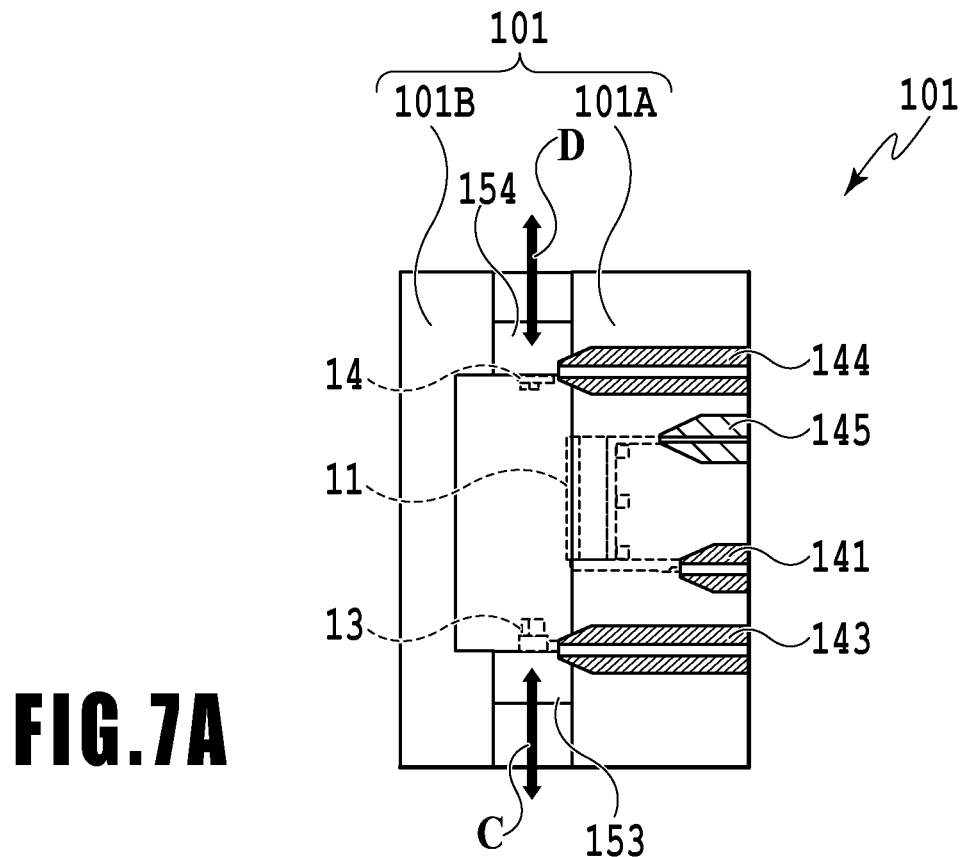
FIG. 7A is a cross-sectional view along line VIIA-VIIA of FIG. 6A
Figure 7B:
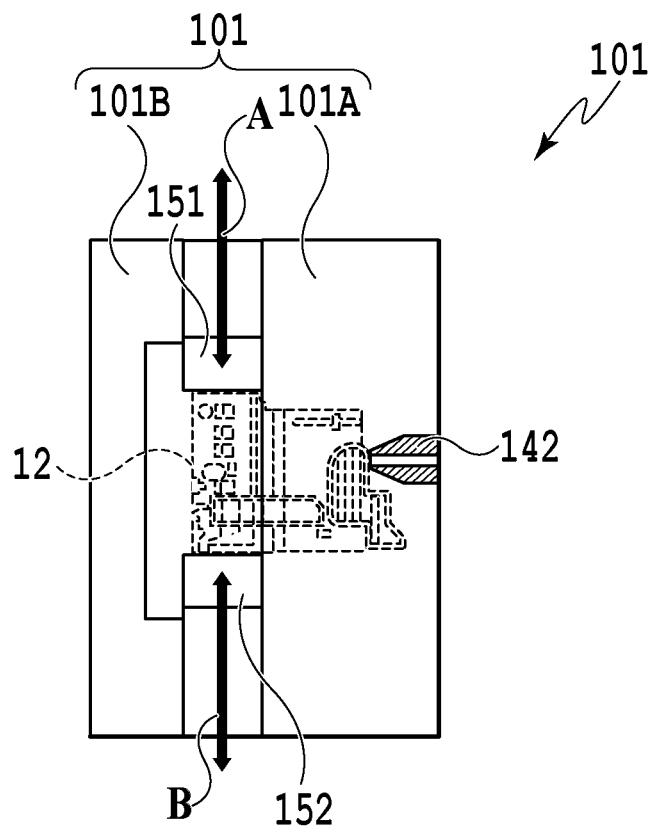
FIG. 7B is a cross-sectional view along line VIIB-VIIB of FIG. 6A.

FIG. 6A, FIG. 6B, FIG. 7A, and FIG. 7B are illustrations of the mold 101 immediately after primary molding of the first and second forming members 11 and 12 and the first and second lid members 13 and 14. FIG. 6A is a VIA arrow view of FIG. 5. FIG. 6B is a VIB arrow view of FIG. 6A. FIG. 7A is a schematic cross-sectional view along line VIIA-VIIA of FIG. 6A. FIG. 7B is a schematic cross-sectional view along line VIIB-VIIB of FIG. 6A. Slides 151 and 152 are slides for configuring the bent flow paths in the second forming member 12 and are slidable in directions of arrows A and B, respectively. Slides 153 and 154 are slides for holding the first and second lid members 13 and 14 and incorporating them into the second forming member and are slidable in directions of arrows C and D, which are the same directions as arrows A and B.

FIG. 8A to FIG. 8D are illustrations of an assembling operation of the ink supply component 4 by the mold 101.

Figure 8A:
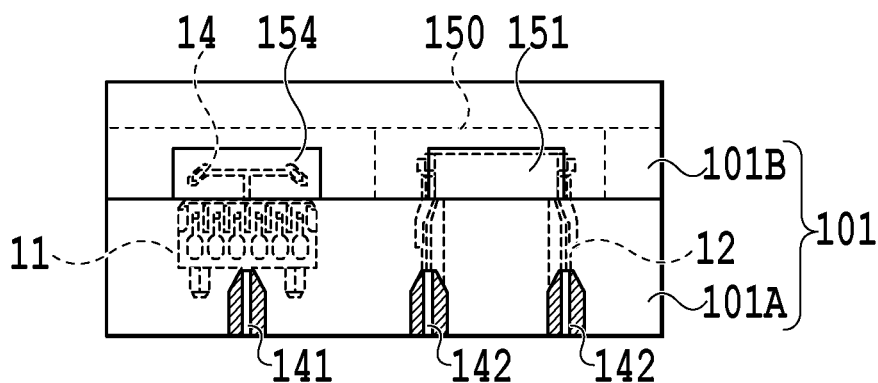
FIG. 8A, FIG. 8B, FIG. 8C, and FIG. 8D are illustrations of a manufacturing method of the ink supply component of FIG. 1A.
Figure 8B:
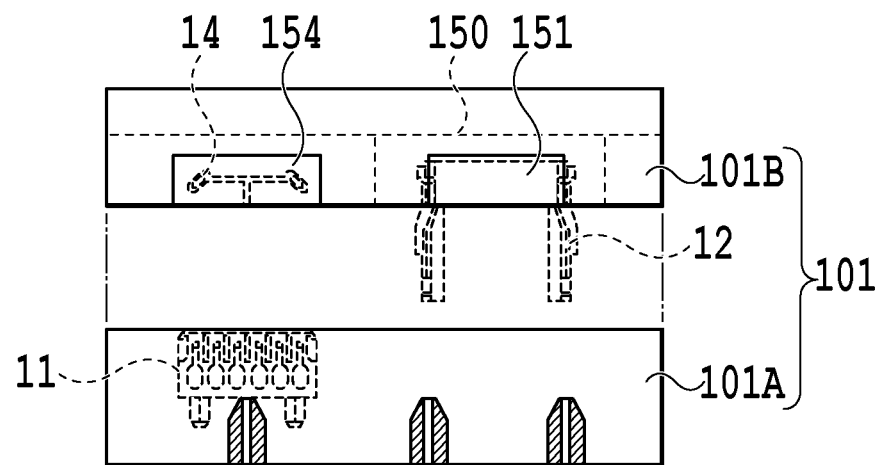

FIG. 8A shows a state of completion of primary molding of the first and second forming members 11 and 12 and the first and second lid members 13 and 14. These four primary molded articles are molded in the mold 101. FIG. 8B shows an open state of the mold 101. The first forming member 11 is held in a fixed-side mold (fixed mold) 101A of the mold 101. The second forming member 12 and the first and second lid members 13 and 14 are held in a movable-side mold (movable mold) 101B of the mold 101. At this time, the first and second lid members 13 and 14 are moved together with the slides 153 and 154 of the movable mold 101B in the directions of arrows C2 and D2 while being held by the slides 153 and 154, respectively.

Figure 8C:
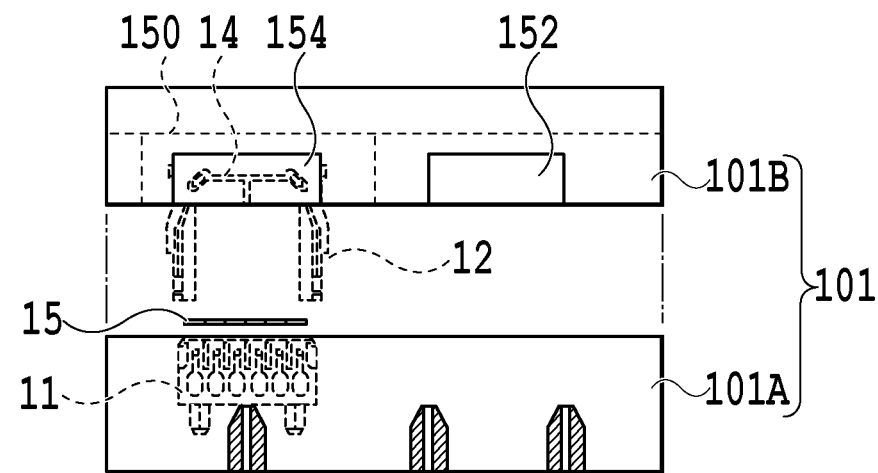

FIG. 8C shows a state of completion of movement of the movable mold 101B by a die sliding mechanism 150. The second forming member 12 held by the movable mold 101B is moved by the die sliding mechanism 150 to a position facing the first forming member 11. The position where the second forming member 12 faces the first forming member 11 is also a position where the second forming member 12 faces the slides 153 and 154.

Figure 8D:
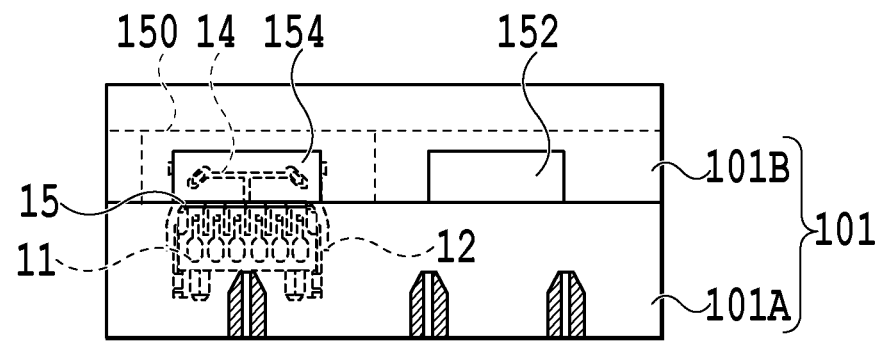

Before the mold 101 is clamped again, the slides 153 and 154 are moved in the directions of arrows C1 and D1 and the first and second lid members 13 and 14 are brought into contact with the second forming member 12 in order to form bent ink flow paths. In this state, the filter 15 is inserted into and temporarily fixed to either the first forming member 11 or the second forming member 12. It is preferable that the filter 15 is inserted by using a robot hand or the like in conformity with the timing of molding. FIG. 8D is a state of clamping the mold 101 again for secondary injection molding. This state is similar to the state of assembling shown in FIG. 2.

In the present embodiment, the die sliding mechanism 150 is driven by a motor cylinder and the slides 151, 152, 153, and 154 are driven by a hydraulic cylinder. The types of cylinders for driving are selected as appropriate depending on their accompanying equipment, space for the mold and the like.

Figure 9A:
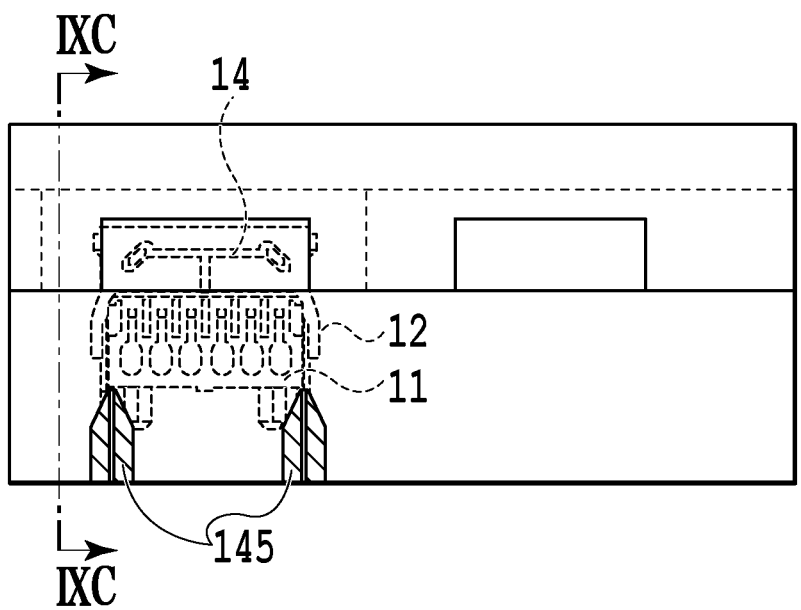
FIG. 9A is a plan view of a mold in secondary injection molding.
Figure 9B:
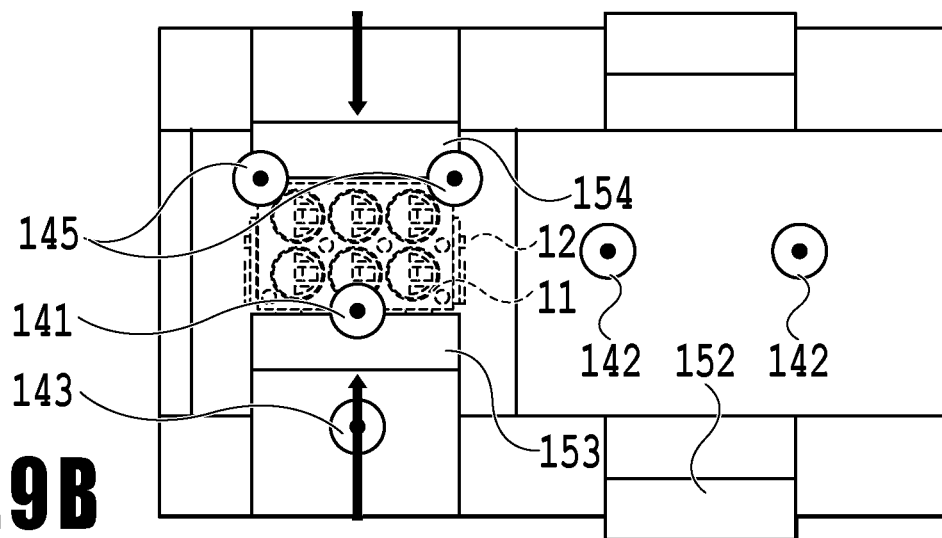
FIG. 9B is a front view of the mold.
Figure 9C:
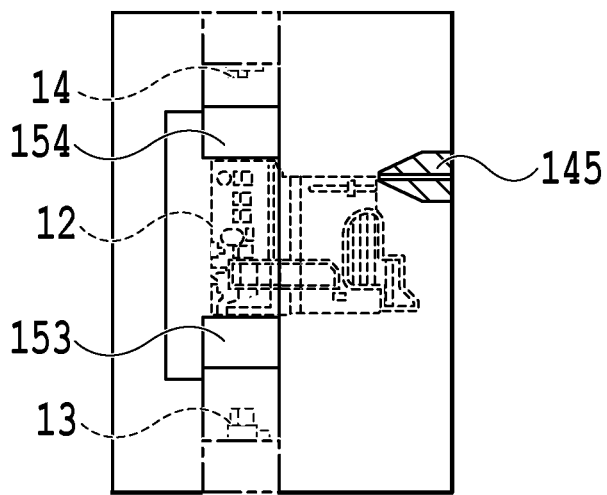
FIG. 9C is a cross-sectional view along line IXC-IXC of FIG. 9A.

FIG. 9A to FIG. 9C are illustrations of the mold 101 in secondary injection molding. FIG. 9A is a plan view of the mold 101. FIG. 9B is a front view of the mold 101. FIG. 9C is a schematic cross-sectional view along line IXC-IXC of FIG. 9A. The secondary molding resin 31 is injected from the gates 145, whereby the four primary molded articles and the filter 15 are integrated between the paired molds as shown in FIG. 3A and FIG. 3B.

Figure 10A:
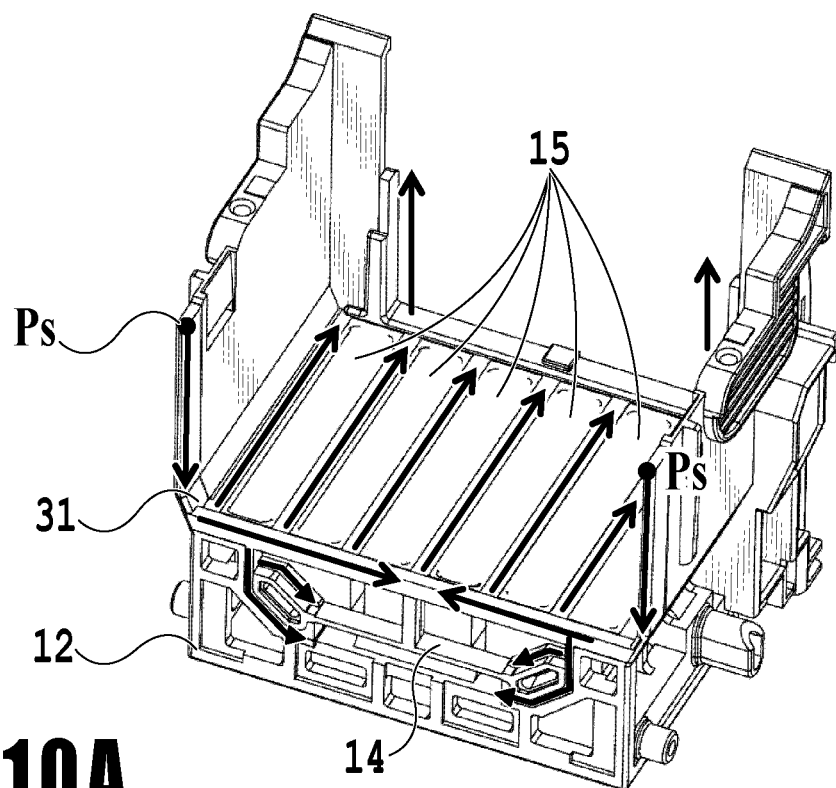
FIG. 10A and FIG. 10B are illustrations of flows of molten resin at the manufacturing stage of the ink supply component of FIG. 1A.
Figure 10B:
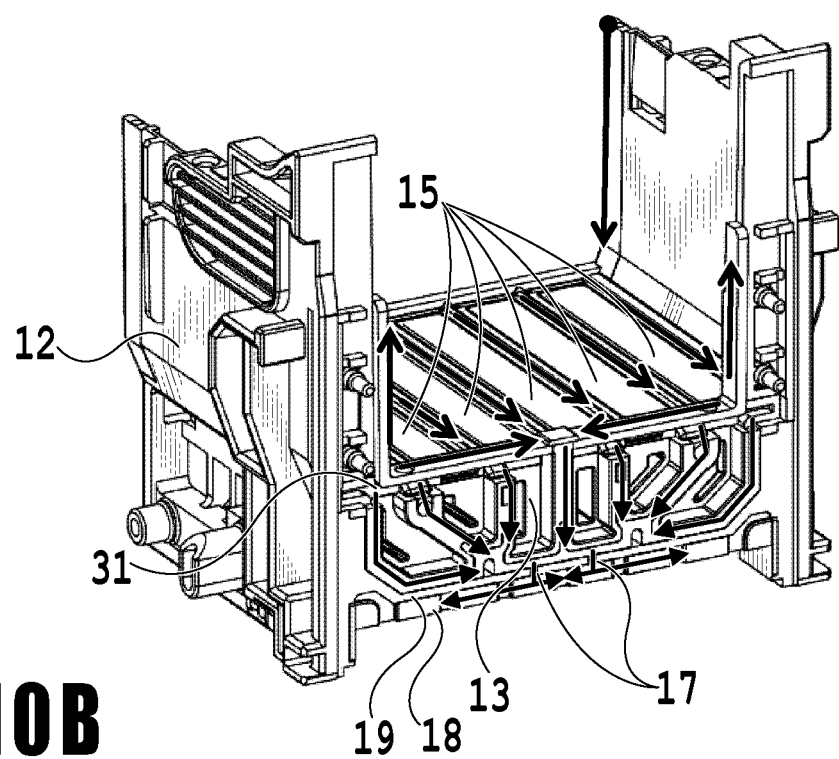

FIG. 10A and FIG. 10B are illustrations of flows of the secondary molding resin 31 without showing the first forming member 11. In the present embodiment, the secondary molding resin 31 is injected from the two gates 145. The secondary molding resin 31 injected from the gates 145 flows from positions Ps corresponding to the gates 145 in the directions of arrows in FIG. 10A and FIG. 10B and first seals the periphery of the second lid member 14. Next, the secondary molding resin 31 seals the periphery of the filter 15 and then seals the periphery of the first lid member 13 located at the bottom of the back surface of the second forming member 12 and seals and joins the first and second forming members 11 and 12 located at the top of the back surface of the second forming member 12. The secondary molding resin 31 flows in this manner, thereby sealing the entire periphery of the filter 15 and forming the ink supply paths.

For easy and stable filling of the secondary molding resin 31 without any excess or deficiency, orifice portions (narrowing portions) 17 and a reservoir portion 18 are formed between the second forming member 12 and the mold 101. A wall portion 19 of the second forming member 12 is located between the reservoir portion 18 and the filling space of the secondary molding resin 31 formed between the first and second forming members 11 and 12. Two orifice portions 17 for narrowing flow paths of the secondary molding resin 31 are formed between notches provided on the wall portion 19 and the mold 101. The secondary molding resin 31 flowing from between the first and second forming members 11 and 12 passes through the orifice portions 17 as shown by arrows in FIG. 10B and FIG. 11A and then flows along the wall portion 19 of the second forming member 12 inside the reservoir portion 18. Forming the orifice portions 17 and the reservoir portion 18 enables the secondary molding resin 31 to be reliably filled without any excess or deficiency so that the secondary molding resin 31 seals the periphery of the filter 15 as will be described later.

The orifice portions 17 and the reservoir portion 18 are described below.

Figure 11A:
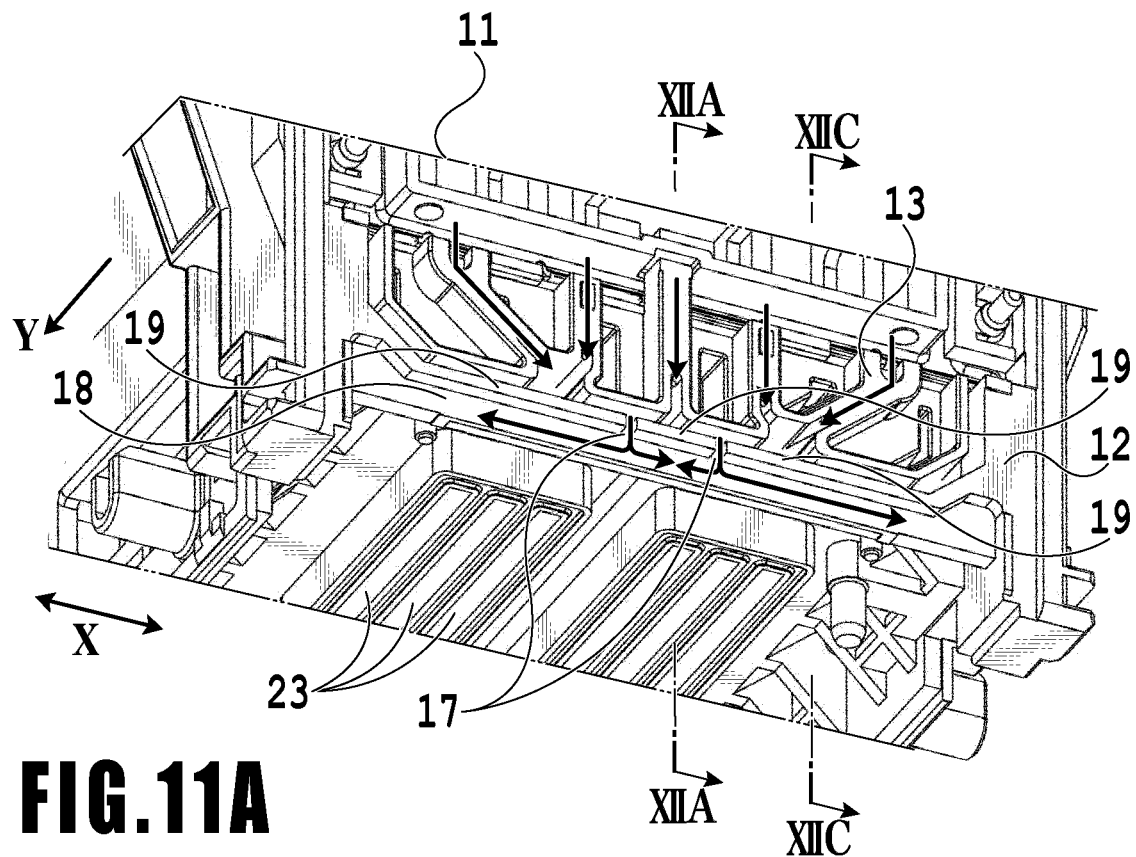
FIG. 11A is a perspective view of the ink supply component of FIG. 1A before filling of molten resin and FIG. 11B is a perspective view of the ink supply component of FIG. 1A after filling of molten resin.
Figure 11B:
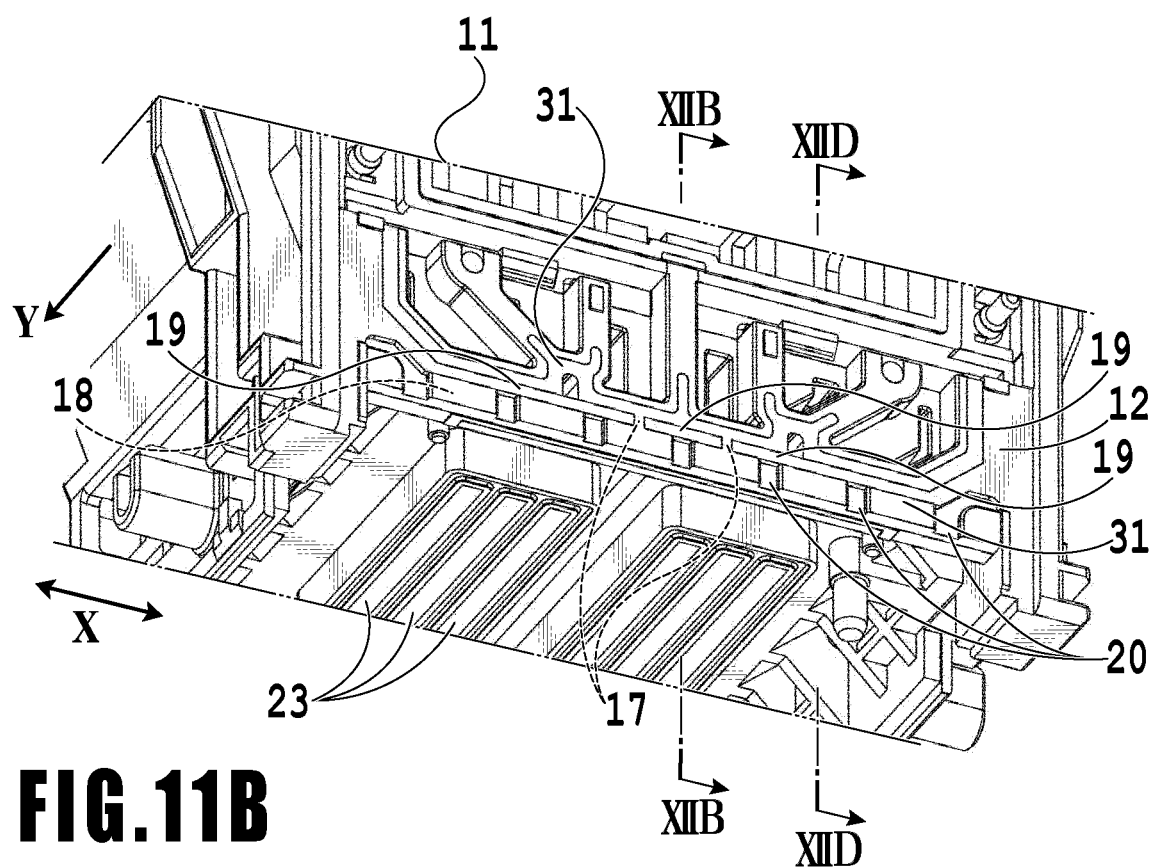
Figure 12A:
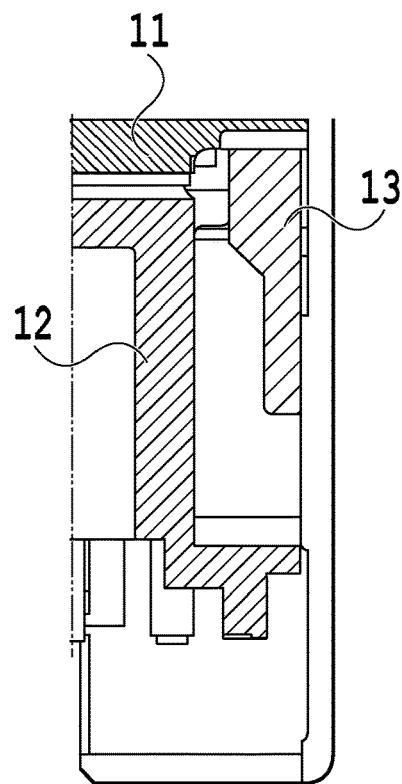
FIG. 12A is a cross-sectional view along line XIIA-XIIA of FIG. 11A.
Figure 12B:
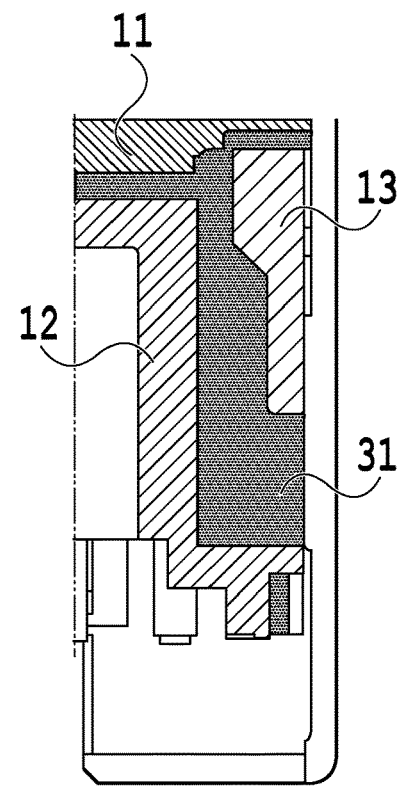
FIG. 12B is a cross-sectional view along line XIIB-XIIB of FIG. 11B.
Figure 12C:
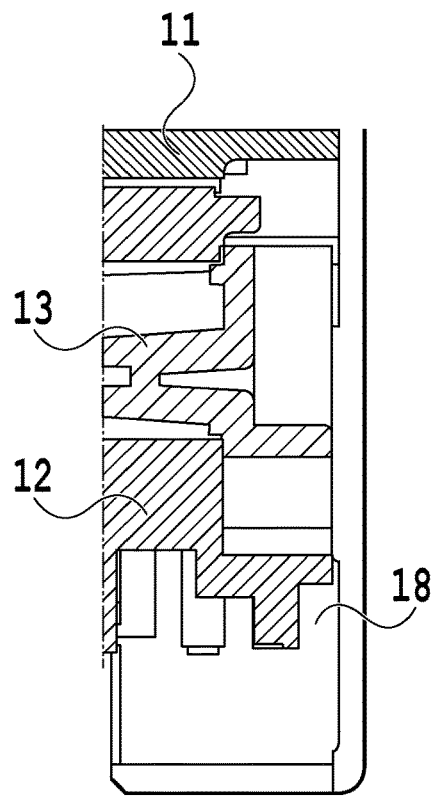
FIG. 12C is a cross-sectional view along line XIIC-XIIC of FIG. 11A.
Figure 12D:
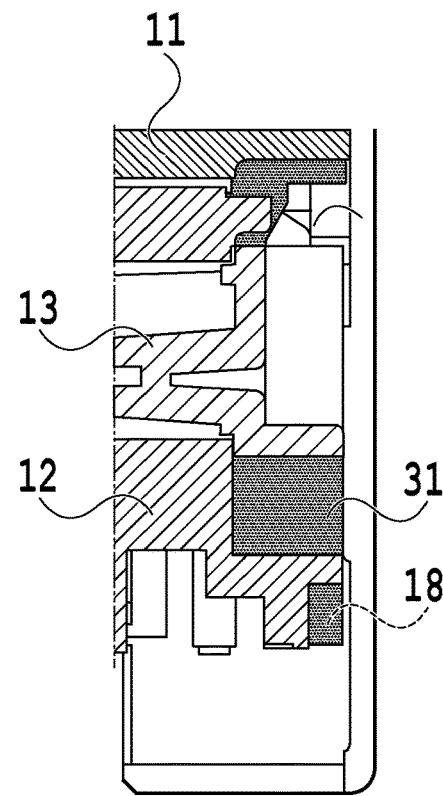
FIG. 12D is a cross-sectional view along line XIID-XIID of FIG. 11B.

FIG. 11A is a perspective view of the ink supply component 4 before the secondary molding resin 31 is poured. FIG. 11B is a perspective view of the ink supply component 4 after the secondary molding resin 31 is poured. FIG. 12A is an enlarged cross-sectional view along line XIIA-XIIA of FIG. 11A. FIG. 12B is an enlarged cross-sectional view along line XIIB-XIIB of FIG. 11B. FIG. 12C is an enlarged cross-sectional view along line XIIC-XIIC of FIG. 11A. FIG. 12D is an enlarged cross-sectional view along line XIID-XIID of FIG. 11B.

The secondary molding resin 31 flows in the directions of arrows in FIG. 10A and FIG. 10B to seal the periphery of the second forming member 12 and the first lid member 13. Then, a plurality of flows of the secondary molding resin 31 merge together at a weld portion (merging portion) that is a final filling portion. The orifice portions 17 are formed near the weld portion. The secondary molding resin 31 fulfills its function of joining the primary molded articles at a time when it reaches the orifice portions 17. The secondary molding resin 31 overfilled due to variations in the filling volume of the secondary molding resin 31 is squeezed into the reservoir portion 18 through the orifice portions 17. As a result, the secondary molding resin 31 can be filled easily and reliably without excessively raising pressure inside the flow paths of the secondary molding resin 31. An excessive pressure rise inside the flow paths of the secondary molding resin 31 may cause leakage of the secondary molding resin 31 and deformation of the primary molded articles. In particular, in the case of sealing the periphery of the filter 15 with the secondary molding resin 31 as in the present embodiment, there is a possibility that the secondary molding resin 31 deforms the filter 15 by pushing the end of the filter 15 directly or indirectly with the primary molded articles.

As described above, forming the reservoir portion 18 enables easy and reliable filling of the secondary molding resin 31 by suppressing leakage of the secondary molding resin 31, deformation of the primary molded articles, and deformation of the filter 15 caused by excessive filling of the secondary molding resin 31. The filling volume of the secondary molding resin 31 can be set in consideration of the capacity of the reservoir portion 18. Accordingly, even in the case of a shortage of the filling volume of the secondary molding resin 31, the secondary molding resin 31 can be filled sufficiently to fulfill the function of joining the primary molded articles. In short, the reservoir portion 18 has the function of absorbing variations in the filling volume of the secondary molding resin 31. The filling volume of the secondary molding resin 31 to the reservoir portion 18 varies according to a filling volume corresponding to the filling pressure and filling time of the secondary molding resin 31. Accordingly, a space between the second forming member 12 and the mold 101 forming the reservoir portion 18 is filled with the secondary molding resin 31 in some cases as shown in FIG. 13A and is not filled with the secondary molding resin 31 in other cases as shown in FIG. 13B and FIG. 13C. In any case, the secondary molding resin 31 is injected at least to a position where the secondary molding resin 31 passes through the orifice portions 17.

The wall portion 19 of the second forming member 12 forming the orifice portions 17 receives pressure toward the reservoir portion 18 shown at the bottom of FIG. 11A at the time of filling of the secondary molding resin 31. The reservoir portion 18 in the present embodiment is formed between the slide 153 of the mold 101 and the surface of the second forming member 12. The slide 153 is equipped with projection portions in contact with the wall portion 19 for suppressing deformation of the wall portion 19 toward the reservoir portion 18. The projection portions of the slide 153 comes to form recess portions 20 on the surface of the secondary molding resin 31 after injection molding as shown in FIG. 11B. That is, so-called excess portions are formed from the secondary molding resin 31 in the reservoir portion 18, the recess portions 20 is formed on the surfaces of the excess portions, and part of the lower surface of the wall portion 19 shown in FIG. 11B is exposed. In the example of FIG. 11B, seven projection portions in total provided in the slide 153 form corresponding seven recesses portions 20. The secondary molding resin 31 in the orifice portions 17 forms narrow connection portions (narrow portions) connecting the portions of the first and second forming members 11 and 12 joined with the secondary molding resin 31 to the excess portions formed in the reservoir portion 18.

As described above, the projection portions of the slide 153 in contact with the wall portion 19 have the reinforcing function of suppressing deformation of the wall portion 19 until the secondary molding resin 31 passes through the orifice portions 17. Since the existence of the projection portions of the slide 153 reduces the capacity of the reservoir portion 18, the number, width and the like of projection portions are set in consideration of a relationship between the capacity of the reservoir portion 18 to be ensured and the strength of the wall portion 19 to be ensured. In the present embodiment, seven narrow projection portions are provided at regular intervals on the slide 153. As a result, as shown by parts (a) and (b) of FIG. 14, the secondary molding resin 31 flows into the reservoir portion 18 formed between the second forming member 12 and the unshown slide 153, and the secondary molding resin 31 forms excess portions with seven narrow recess portions 20 at regular intervals on its surface. The recess portions 20 thus formed at regular intervals serve as a guide for visually confirming variations in the filling volume of the secondary molding resin 31 and abnormality in the filling state. Since the secondary molding resin 31 in the reservoir portion 18 is located on the surface of the second forming member 12, it forms the excess portions but does not have a possibility of dropping off or interfering with mounting of the print head 1 on the carriage. Therefore, there is no need to cut off the secondary molding resin 31 in the reservoir portion 18.

Further, since the serial scan type printing apparatus of the present embodiment prints an image while moving the print head 1 in the main scan direction, inertial force acts on the print head 1 in the main scan direction. In terms of printing accuracy, it is preferable that the print head 1 maintains mass balance with respect to the main scan direction. Accordingly, the reservoir portion 18 in the present embodiment is symmetrical about the scan direction of arrow X as shown in FIG. 11A, with the result that the excess portions symmetrical about the scan direction of arrow X are formed as shown in FIG. 11A.

Further, since the volume of the secondary molding resin 31 flowing into the reservoir portion 18 varies, this may damage the appearance of the print head 1 and raise the possibility of seeming recognition that the reservoir portion 18 is not sufficiently filled with molten resin. In the serial scan type printing apparatus, the body of the printing apparatus is connected to the print head 1 on the carriage via electrical wiring. In general, an electrical connection portion and an electrical connection component 5 (see FIG. 1A) are provided upstream in the conveyance direction of print media (arrow Y direction) in the ink supply component 4 so that the electrical wiring does not interfere with print scans. It is therefore preferable that the reservoir portion 18 is located upstream in the conveyance direction of print media (arrow Y direction) in the ink supply component 4 so that the electrical connection component 5 can hide the reservoir portion 18 in the case of assembling the print head 1 including the ink supply component 4.

Second Embodiment

Figure 14:
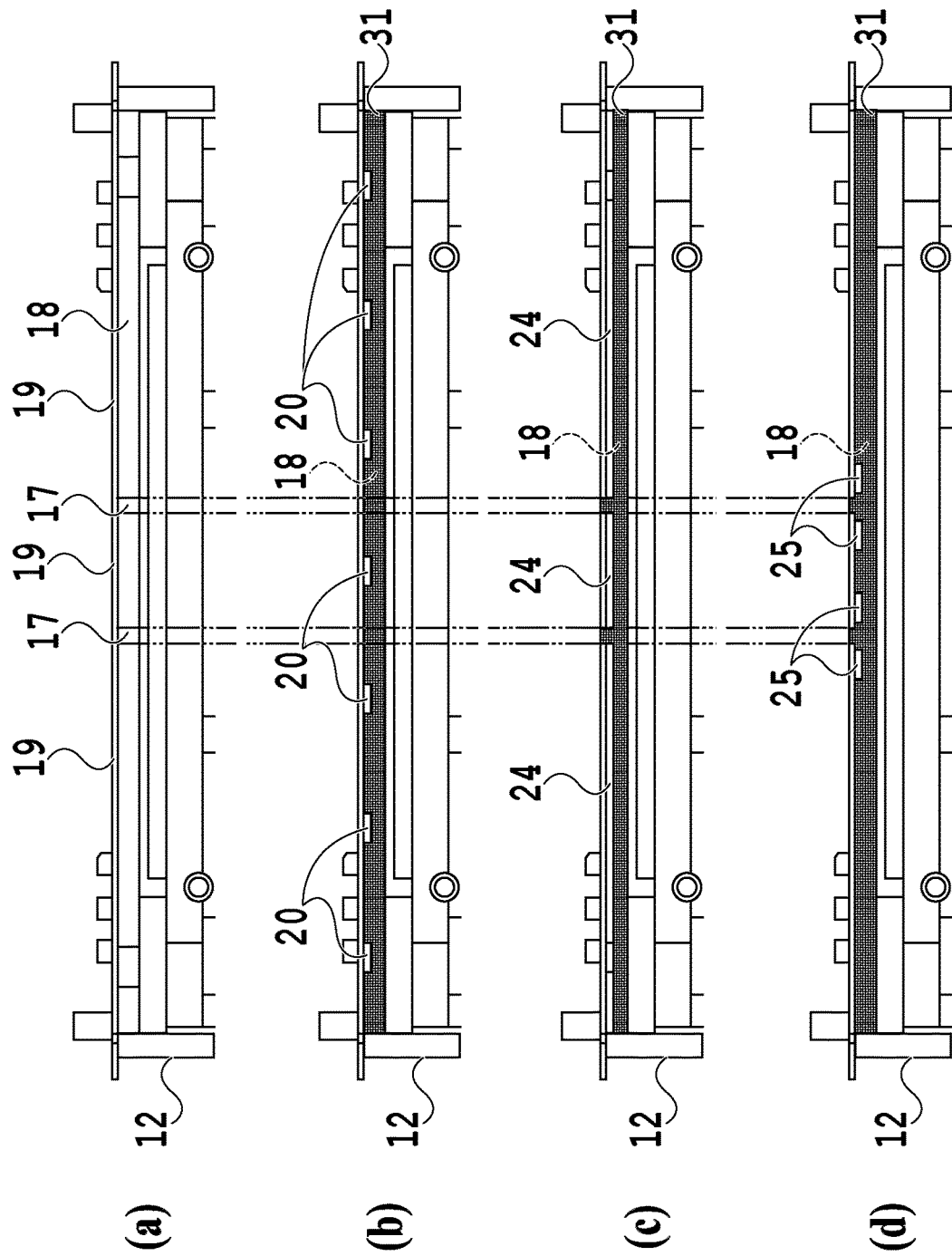
FIG. 14 is an explanatory diagram for explaining different examples of an excess portion formed from molten resin in a reservoir portion; a part (a) of FIG. 14 shows a reservoir portion in the first embodiment of the present invention; a part (b) of FIG. 14 shows an excess portion in the first embodiment of the present invention; a part (c) of FIG. 14 shows an excess portion in a second embodiment of the present invention; a part (d) of FIG. 14 shows an excess portion in a third embodiment of the present invention.
Figure 15:
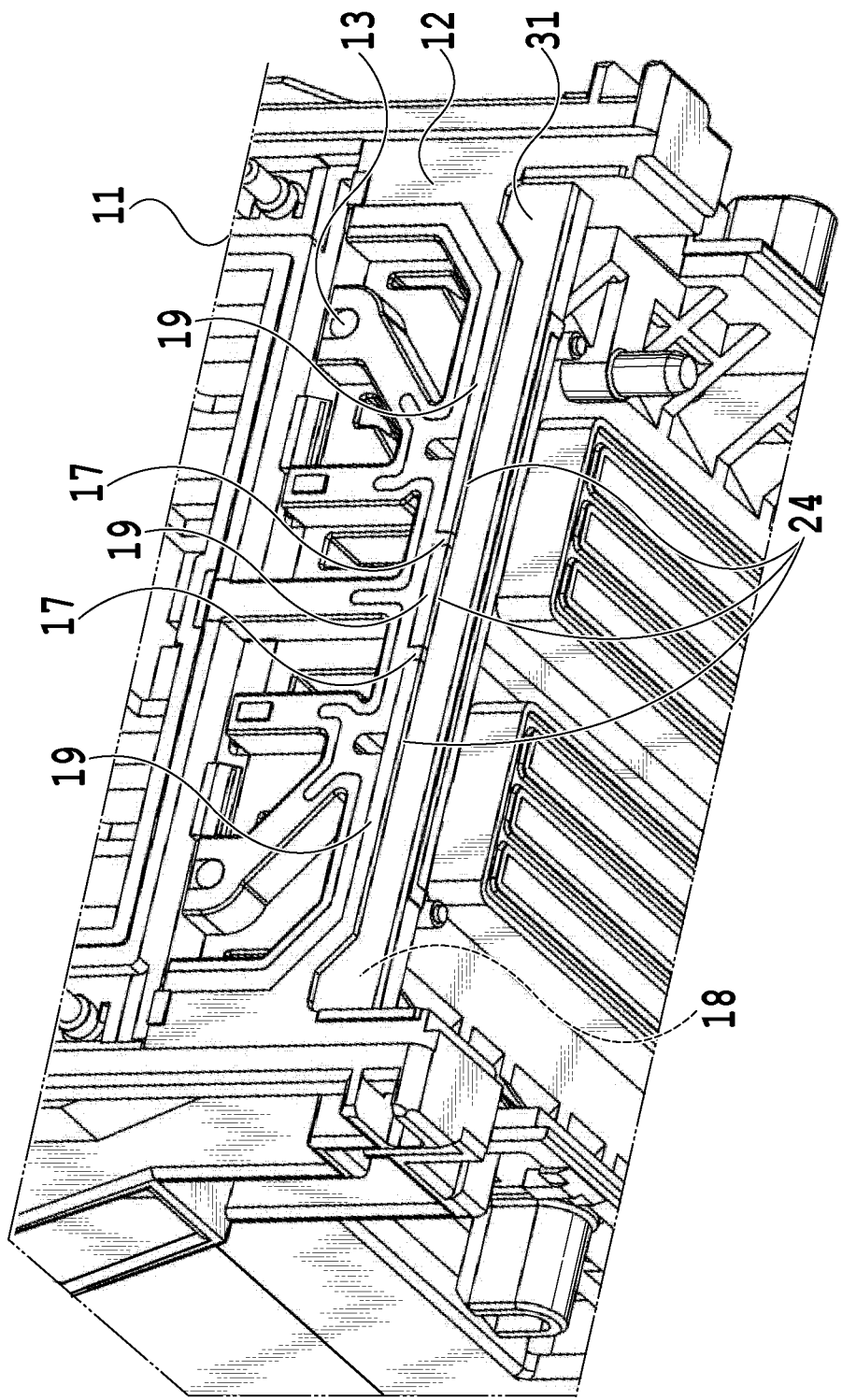
FIG. 15 is a perspective view of the main part of an ink supply component according to the second embodiment of the present invention.

In the present embodiment, the slide 153 forming the reservoir portion 18 comprises an unshown projection portion in contact with the entire lower surface of the wall portion 19 of the second forming member 12 shown in part (c) of FIG. 14 and FIG. 15. In the present embodiment, the wall portion 19 is divided by the two orifice portions 17 into three parts, namely the left, center, and right parts shown in FIG. 15. The slide 153 is equipped with three projection portions, namely, the left, center, and right projection portions in contact with the lower surfaces of the parts of the wall portion 19. Accordingly, the surface of the secondary molding resin 31 after injection molding has three recess portions (step portions) 24, corresponding to the three projection portions, namely the left, center, and right projection portions of the slide 153. Part of the lower surface of the wall portion 19 of the second forming member 12 is exposed continuously in the extending direction of the wall portion 19.

Like the first embodiment, the projection portions of the slide 153 have the reinforcing function of suppressing deformation of the wall portion 19 until the secondary molding resin 31 passes through the orifice portions 17 by contacting the thin wall portion 19 forming the reservoir portion 18. In the present embodiment, the reinforcing function can be further improved by continuously providing the projection portions of the slide 153.

Third Embodiment

Figure 16:
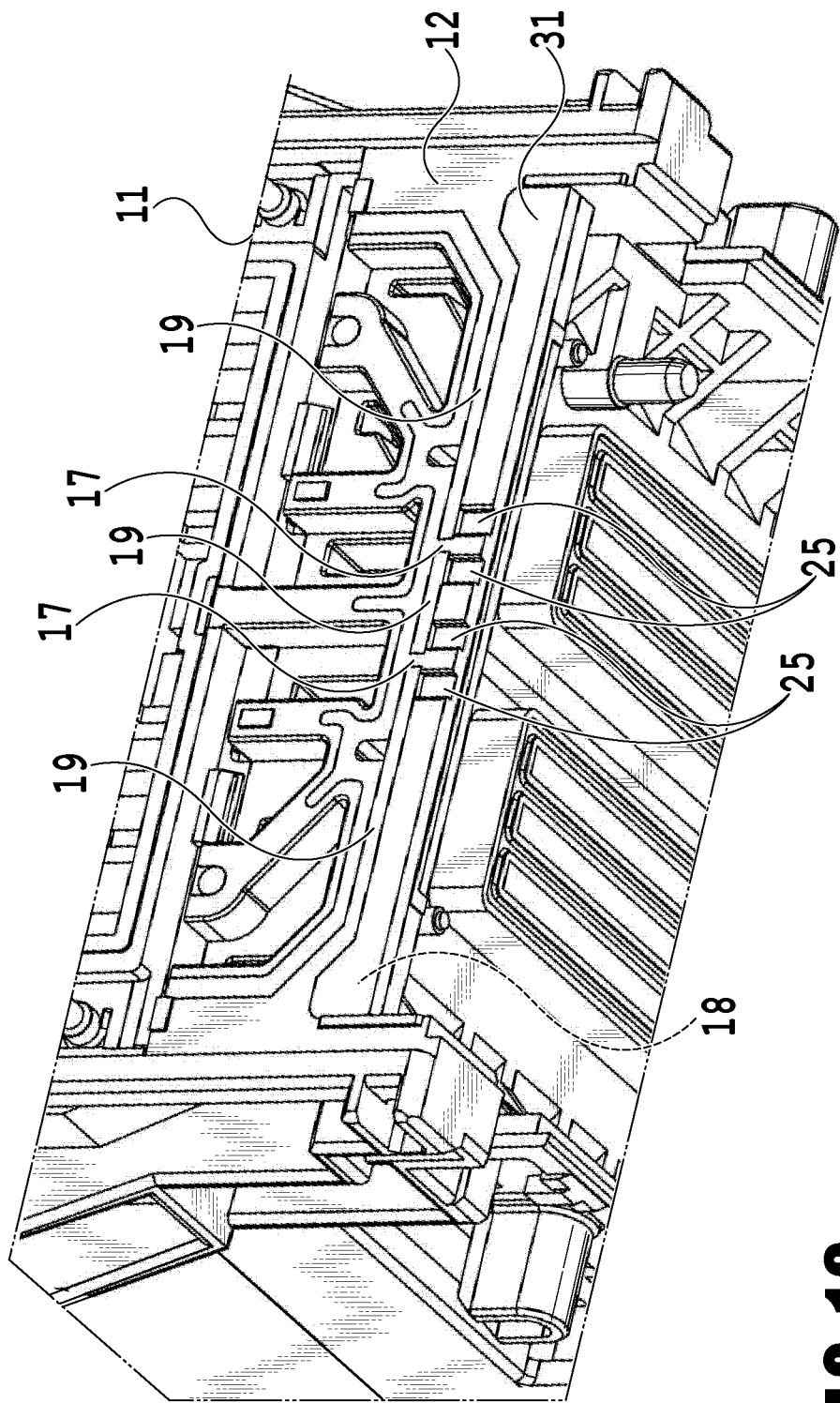
FIG. 16 is a perspective view of the main part of an ink supply component according to the third embodiment of the present invention.

In the present embodiment, the slide 153 forming the reservoir portion 18 comprises unshown projection portions in contact with the lower surface of the wall portion 19 of the second forming member 12 near the orifice portions 17. In the present embodiment, two orifice portions 17 are formed, and accordingly, the slide 153 is provided with projection portions on the left and right sides of each of the orifice portions 17 in FIG. 16, that is, four projection portions in total. As a result, the surface of the secondary molding resin 31 after injection molding has recess portions (step portions) 25 near the left and right side of each of the two orifice portions 17, that is, four recess portions 25 in total, as shown by part (d) of FIG. 14. As described above, in the present embodiment, the projection portions of the slide 153 are concentrated around the orifice portions 17.

The thin wall portion 19 of the second forming member 12 is easily deformable by filling pressure of the secondary molding resin 31. In particular, the wall portion 19 around the orifice portions 17 is easily deformable. The projection portions of the slide 153 in the present embodiment effectively suppress such deformation of the wall portion 19 around the orifice portions 17. Accordingly, the projection portions of the slide 153 suppress deformation of the wall portion 19 and the number of projection portion is minimized, thereby sufficiently securing the capacity of the reservoir portion 18 and absorbing variations in the filling volume of the secondary molding resin 31.

Other Embodiments

Projection portions of a mold are in contact with various low-rigidity parts (such as thin parts) of the primary molded articles easily deformable by filling pressure of the secondary molding resin and can suppress deformation of the parts. The position, number and the like of projection portions to be formed can be set as appropriate. In addition, the orifice portions and the reservoir portion may be formed between the mold and at least one of the first forming member and the second forming member. Further, the liquid supply component can be manufactured also by preparing the first forming member and the second forming member manufactured in advance and joining them with molten resin.

The present invention is not limited to the ink supply member included in the inkjet print head and is widely applicable to various liquid supply members in which a liquid supply path is formed. Further, the present invention is not limited to the serial scan type printing apparatus and is applicable to various printing apparatuses such as a full line type printing apparatus that prints an image accompanied by continuous relative movement of a print head and a print medium. Further, the present invention is widely applicable to a liquid ejection head capable of ejecting various liquids and a liquid ejection apparatus that applies liquid to various media by means of the liquid ejection head.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-025835 filed Feb. 16, 2018, which is hereby incorporated by reference wherein in its entirety.

What is claimed is:

1. A manufacturing method of a liquid supply component in which a liquid supply path is formed between a first constituent component and a second constituent component that are joined with molten resin, the method comprising:
   a first step of preparing the first constituent component and the second constituent component;
   a second step of causing the first constituent component and the second constituent component to face each other and forming an orifice portion and a reservoir portion between a mold and a surface of either of the first constituent component and the second constituent component; and
   a third step of pouring the molten resin between the first constituent component and the second constituent component so that the molten resin flowing from between the first constituent component and the second constituent component flows into the reservoir portion through the orifice portion, wherein a wall portion provided on the surface of either of the first constituent component and the second constituent component is located between the reservoir portion and a joining portion of the first constituent component and the second constituent component joined with the molten resin, wherein the orifice portion is formed between the mold and a notch provided on the wall portion, and wherein, in the second step, a projection portion provided in the mold is brought into contact with at least a part of a surface of the wall portion located at the reservoir portion.

2. The manufacturing method according to claim 1, wherein the orifice portion is located at a merging portion where a plurality of flows of the molten resin merge together in the third step.

3. The manufacturing method according to claim 1, wherein, in the second step, a filter is located between the first constituent component and the second constituent component.

4. The manufacturing method according to claim 3, wherein, in the second step, a projection portion provided in the mold is brought into contact with at least a part of a surface of the wall portion located at the reservoir portion.

5. The manufacturing method of a liquid supply component according to claim 4, wherein a wall portion provided on the surface of either of the first constituent component and the second constituent component is located between the reservoir portion and a joining portion of the first constituent component and the second constituent component joined with the molten resin, and wherein the orifice portion is formed between the mold and a notch provided on the wall portion.

6. A manufacturing method of a liquid supply component in which a liquid supply path is formed between a first constituent component and a second constituent component that are joined with molten resin, the method comprising:

a first step of preparing the first constituent component and the second constituent component;

a second step of causing the first constituent component and the second constituent component to face each other and forming an orifice portion and a reservoir portion between a mold and a surface of either of the first constituent component and the second constituent component; and a third step of pouring the molten resin between the first constituent component and the second constituent component so that the molten resin flowing from between the first constituent component and the second constituent component flows into the reservoir portion through the orifice portion, wherein the first step comprises injection-molding the first constituent component between a first position of a first mold and a first position of a second mold and injection-molding the second constituent component between a second position of the first mold and a second position of the second mold, and where the second step comprises:

opening the first mold and the second mold of the mold so that the first constituent component is left at the first position of the first mold and the second constituent component is left at the second position of the second mold, and then relatively moving the first mold and the second mold so that the first constituent component and the second constituent component face each other; and closing the first mold and the second mold so that the first constituent component and the second constituent component face each other, and forming the orifice portion and the reservoir portion between either of the first mold and the second mold and the surface of a corresponding one of the first constituent component and the second constituent component.

7. The manufacturing method according to claim 6, wherein, in the second step, a filter is located between the first constituent component and the second constituent component.

* * * * *